US012655000B2

(12) United States Patent
Maedo et al.

(10) Patent No.: US 12,655,000 B2
(45) Date of Patent: Jun. 16, 2026

(54) WINCH MONITORING METHOD, WINCH MONITORING DEVICE, AND CRANE

(71) Applicant: KOBELCO CONSTRUCTION MACHINERY CO., LTD., Hiroshima (JP)

(72) Inventors: Teppei Maedo, Hyogo (JP); Hiroki Nakayama, Hyogo (JP); Kazufumi Kudara, Hyogo (JP); Yohei Ogawa, Hyogo (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 348 days.

(21) Appl. No.: 18/549,214

(22) PCT Filed: Mar. 2, 2022

(86) PCT No.: PCT/JP2022/008958
§ 371 (c)(1),
(2) Date: Sep. 6, 2023

(87) PCT Pub. No.: WO2022/191005
PCT Pub. Date: Sep. 15, 2022

(65) Prior Publication Data

US 2024/0124272 A1 Apr. 18, 2024

(30) Foreign Application Priority Data

Mar. 10, 2021 (JP) ................................ 2021-038108

(51) Int. Cl.
*B66D 1/54* (2006.01)
*B66C 13/46* (2006.01)
*B66C 15/06* (2006.01)

(52) U.S. Cl.
CPC ............ *B66C 15/065* (2013.01); *B66C 13/46* (2013.01)

(58) Field of Classification Search
CPC ......... B66C 15/065; B66C 13/46; B66C 1/10; B66C 13/04; B66C 15/00;
(Continued)

(56) References Cited

U.S. PATENT DOCUMENTS

2005/0192732 A1* 9/2005 Narisawa ............. B66C 23/905 700/83
2018/0141787 A1 5/2018 Rudy et al.
(Continued)

FOREIGN PATENT DOCUMENTS

AU 2015372216 A1 7/2016
CN 104477723 A 4/2015
(Continued)

OTHER PUBLICATIONS

International Search Report issued Apr. 19, 2022 in PCT/JP2022/008958, filed on Mar. 2, 2022, 2 pages.

*Primary Examiner* — Robert R Raevis
(74) *Attorney, Agent, or Firm* — Oblon, McClelland, Maier & Neustadt, L.L.P.

(57) ABSTRACT

A method for judging a winding disorder of a rope onto a drum of a winch includes acquiring a captured image by a camera oriented to the drum, performing, on the basis of the captured image, a judgment on whether the winding disorder of the rope is present or absent and a determination of a disorder degree indicating the degree of the winding disorder, and outputting results of the judgment and the determination.

14 Claims, 8 Drawing Sheets

(58) Field of Classification Search
CPC .......... B66C 2700/084; B65H 2701/35; B65H 54/2878; B66D 1/38; B66D 1/54; B66D 1/36
USPC ..................... 73/158, 865.8, 865.9; 348/135; 340/425.5, 463, 678, 685; 105/163.1; 212/195–198, 276–281, 294, 295, 296, 212/299, 300; 414/140.3, 141.3, 141.4, 414/141.5, 141.6, 141.7, 142.6, 142.7; 701/36, 50
See application file for complete search history.

(56) References Cited

U.S. PATENT DOCUMENTS

| | | | |
|---|---|---|---|
| 2018/0141788 | A1 | 5/2018 | Rudy et al. |
| 2018/0141789 | A1 | 5/2018 | Rudy et al. |
| 2018/0143011 | A1 | 5/2018 | Rudy et al. |

FOREIGN PATENT DOCUMENTS

| | | | | | |
|---|---|---|---|---|---|
| CN | 105438983 | A | | 3/2016 | |
| DE | 102019126699 | A1 | * | 2/2021 | ............... B66D 1/54 |
| JP | 2004-137035 | A | | 5/2004 | |
| JP | 2018-138489 | A | | 9/2018 | |
| JP | 2020-125162 | A | | 8/2020 | |
| WO | WO 2009/047719 | A2 | | 4/2009 | |
| WO | WO-2017174191 | A1 | * | 10/2017 | ............. B66C 15/06 |
| WO | WO-2021025616 | A1 | * | 2/2021 | ............. G06V 20/38 |

* cited by examiner

WINCH MONITORING METHOD, WINCH MONITORING DEVICE, AND CRANE

TECHNICAL FIELD

The present invention relates to a method and apparatus for monitoring a winding condition of a rope in a drum of a winch, and a crane including the apparatus.

BACKGROUND ART

A typical crane includes a plurality of ropes and a plurality of winches for winding and unwinding the plurality of ropes, respectively. The plurality of ropes include a boom derricking rope for supporting a boom, and a suspension rope to be suspended from the boom to support a suspended load through a hook. Each of the winches includes a drum for winding the corresponding rope of the plurality of ropes, and a motor for rotating the drum.

There may occur disordered winding in the drum. The disordered winding is a state where the winding of the rope is disordered. The disordered winding may involve a trouble, whose examples include a temporary sudden drop of the suspended load.

The following Patent Literature 1 discloses a crane, which includes a camera for imaging a winch and a display device for displaying in a cabin the image provided by the camera. When detecting disordered winding through the image, an operator of the crane performs an operation for re-winding the rope.

The device, however, causes a possibility of the operator to miss the disordered winding or to fail to find it early. The possibility is increased when the operator has to monitor both the image provided by the display device and other conditions such as the movement of a suspended load or a boom.

The winding condition of the rope is likely to be shifted from a slight disorder condition to a severe disorder condition with an increase in the working time and the number of times of operation of the winch. The severe disorder condition causes a re-winding operation of the rope to be required. The delay of finding the occurrence of the disordered winding, therefore, will render the situation worse.

CITATION LIST

Patent Literature

Patent Literature 1: Japanese Unexamined Patent Publication No. 2004-137035

SUMMARY OF INVENTION

It is an object of the present invention to provide a winch monitoring method, a winch monitoring apparatus, and a crane, each of which enables disordered rope winding in a drum of a winch to be early detected.

Provided is a method for monitoring a condition of a rope wound around a drum of a winch. The method includes: orienting a camera to the drum to acquire a captured image of the drum and the rope by the camera; performing judgment on whether a winding disorder of the rope is present or absent and determination of a disorder degree that is a degree of the winding disorder when the winding disorder is present, on the basis of the captured image; and outputting a result of the judgment and the determination.

Also provided is an apparatus for monitoring a condition of a rope wound around a drum of a winch. The apparatus includes: a camera oriented to the drum of the winch to generate a captured image of the drum and the rope; and a processor that performs judgment on whether a winding disorder of the rope is present or absent and determination of a disorder degree that is a degree of the winding disorder when the winding disorder is present, on the basis of the captured image, and outputs a result of the judgment and the determination.

Also provided is a crane including a boom, a winch, a camera, and a processor. The boom has a distal end from which a suspended load is suspended. The winch includes a drum for winding a rope that supports the suspended load or the boom and a motor for rotating the drum. The camera is oriented to the drum to generate a captured image of the drum and the rope. The processor performs judgment on whether a winding disorder of the rope is present or absent and determination of a disorder degree that is a degree of the winding disorder, on the basis of the captured image, and outputs a result of the judgment and the determination.

DESCRIPTION OF EMBODIMENTS

There will be described an embodiment of the present invention with reference to the drawings. The following embodiment is illustrative of the invention, not intended to limit the scope of the invention.

Figure 1:
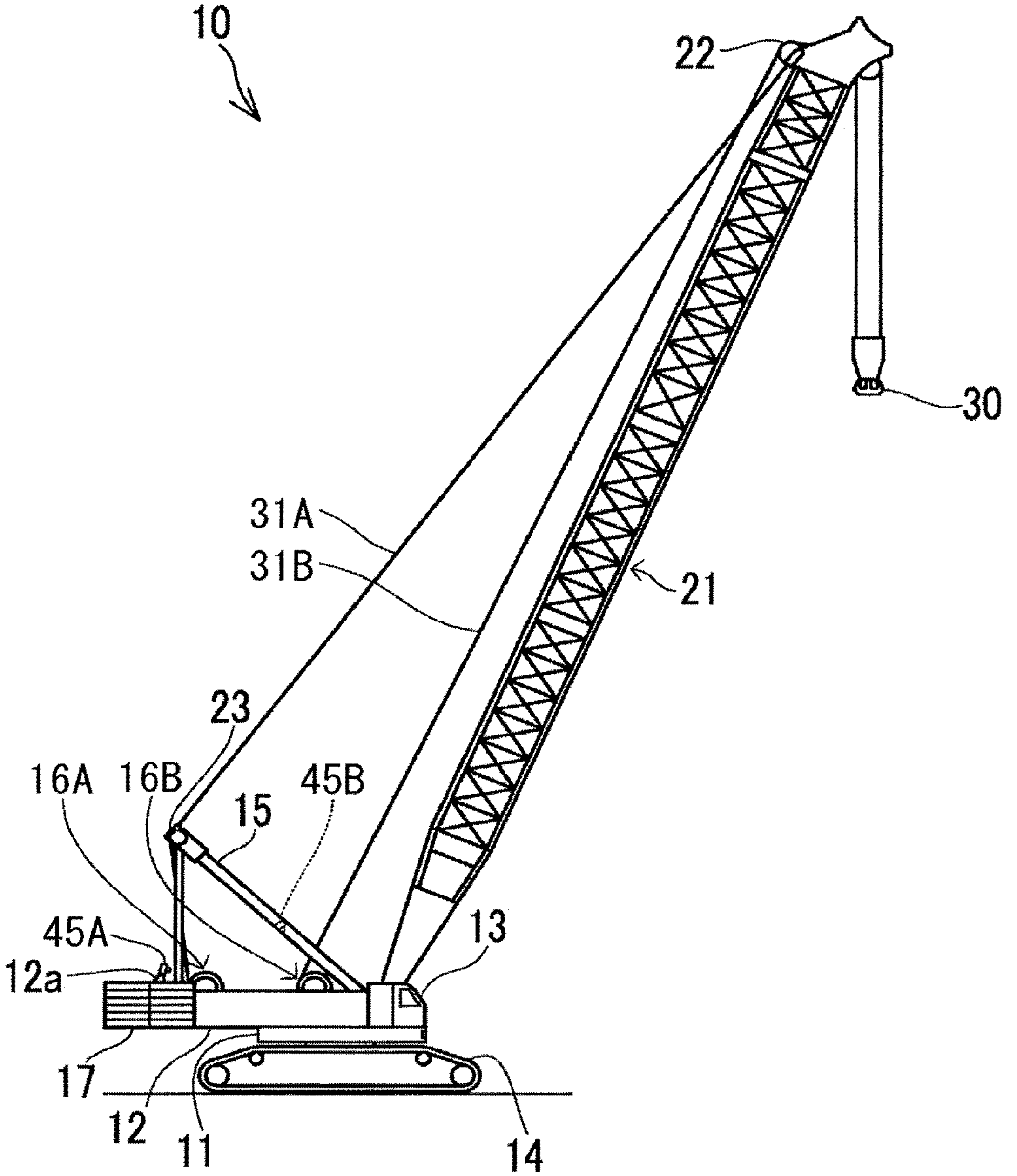
FIG. 1 is a side view of a crane according to an embodiment of the present invention.

FIG. 1 shows a crane 10 according to the embodiment of the present invention. The crane 10 is a work machine capable of moving a suspended load while lifting it.

As shown in FIG. 1, the crane 10 includes a lower body 11, an upper body 12, a cab 13, a gantry 15, a first winch 16A, a second winch 16B, a counterweight 17, a boom 21, a boom point idler sheave 22, a counterweight 17, a hook 30, a gantry sheave 23, a first rope 31A, and a second rope 31B.

The cab 13, the gantry 15, the first winch 16A, and the second winch 16B are mounted on the upper body 12 so as to be turned integrally with the upper body 12. The gantry 15 is fixed to the upper body 12 so as to stand up on the upper body 12. The upper body 12 supports the counterweight 17 and the boom 21 in addition to the first winch 16A and the second winch 16B.

The lower body 11 is a base part, which supports the upper body 12 capably of turning. The upper body 12 is a turning body, which is driven to be turned by a non-illustrated driving source provided in the lower body.

The crane 10 is a mobile crane. Specifically, the crane 10 further includes a travelling device 14. The travelling device 14 is capable of travelling motion while supporting the lower body 11. The travelling device 14 illustrated in FIG. 1 is a crawler type device.

The cab 13 allows an operator to manipulate the crane 10 in the cab 13. The boom 21 includes a boom foot that is a root part thereof and connected to the upper body 12 movably rotationally about a horizontal axis. The boom 21 can be raised and lowered with respect to the upper body 12 by the vertically rotational movement about the boom foot. The boom 21 has a distal end, from which a suspended load can be suspended through the second rope 31B.

The first winch 16A and the gantry 15 support the boom 21 through the first rope 31A. The first rope 31A is, thus, a derricking rope for supporting the boom 21. The gantry 15 has a top on which a gantry sheave 23 is rotatably mounted. The first rope 31A is drawn out from the first winch 16A and connected to the distal end of the boom 21 while being placed on the gantry sheave 23.

The second winch 16B supports the hook 30 and the suspended load engaged with the hook 30, through the second rope 31B. The second rope 31B is, thus, a suspension rope for supporting the suspended load. The second rope 31B is drawn out from the second winch 16B and supports the suspended load through the hook 30 while hanging from the boom point idler sheave 22 which is rotatably attached to the distal end of the boom 21.

The first winch 16A winds and unwinds the first rope 31A to thereby raise and lower the boom 21, respectively. The second winch 16B winds and unwinds the second rope 31B to thereby lift and lower the hook 30, respectively.

Figure 4:
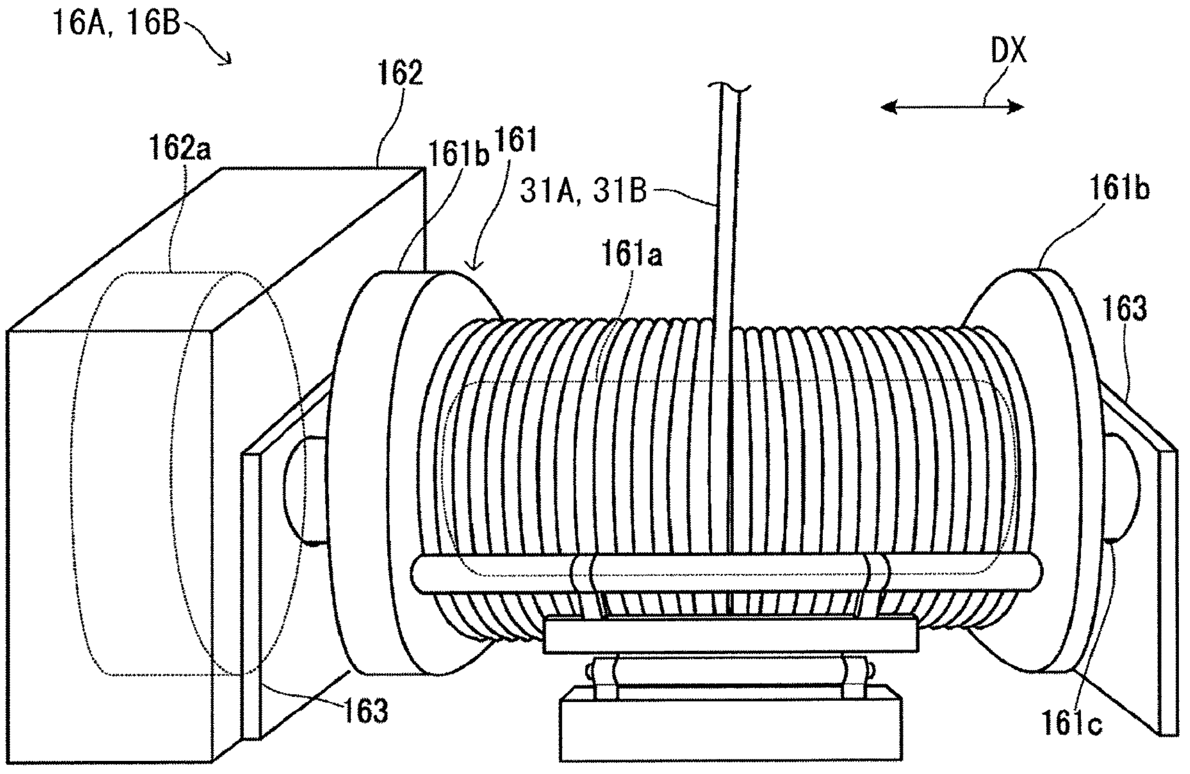
FIG. 4 is a perspective view of a winch installed on the crane.

Each of the first and second winches 16A, 16B includes a drum 161, a driving device 162, and a pair of drum supports 163, which are shown in FIG. 4.

The drum 161 includes a body 161*a*, a pair of flange parts 161*b*, and a rotary shaft 161*c*. The body 161*a* has an outer peripheral surface, which has a shape similar to a cylinder around the rotary shaft 161*c*. On the outer peripheral surface is wound the corresponding rope out of the first and second ropes 31A, 31B. The pair of flange parts 161*b* project radially outward beyond the outer peripheral surface of the drum 161 at opposite ends of the drum 161 in the axial direction DX of (the body 161*a* of) the drum 161. The axial direction DX is a direction along the rotary shaft 161*c*. The pair of drum supports 163 include respective bearings and rotatably supports the opposite ends of the rotary shaft 161*c* by the bearings, respectively.

The driving device 162 rotationally drives the drum 161. The driving device 162 includes a motor 162*a* and a non-illustrated reduction gear. The motor 162*a* is coupled to the drum 161 via the reduction gear to rotate the drum 16. The motor 162*a* in the present embodiment is a hydraulic motor, which is driven by the supply of hydraulic fluid from the hydraulic pump 42 shown in FIG. 2 to rotate the drum 161. The reduction gear includes at least one gear to transmit the rotational force generated by the motor 162*a* to the drum 161 at a predetermined reduction ratio.

The counterweight 17 is arranged to balance the weight of the counterweight 17 and the weight of the boom 21, the hook 30, and the suspended load.

Figure 2:
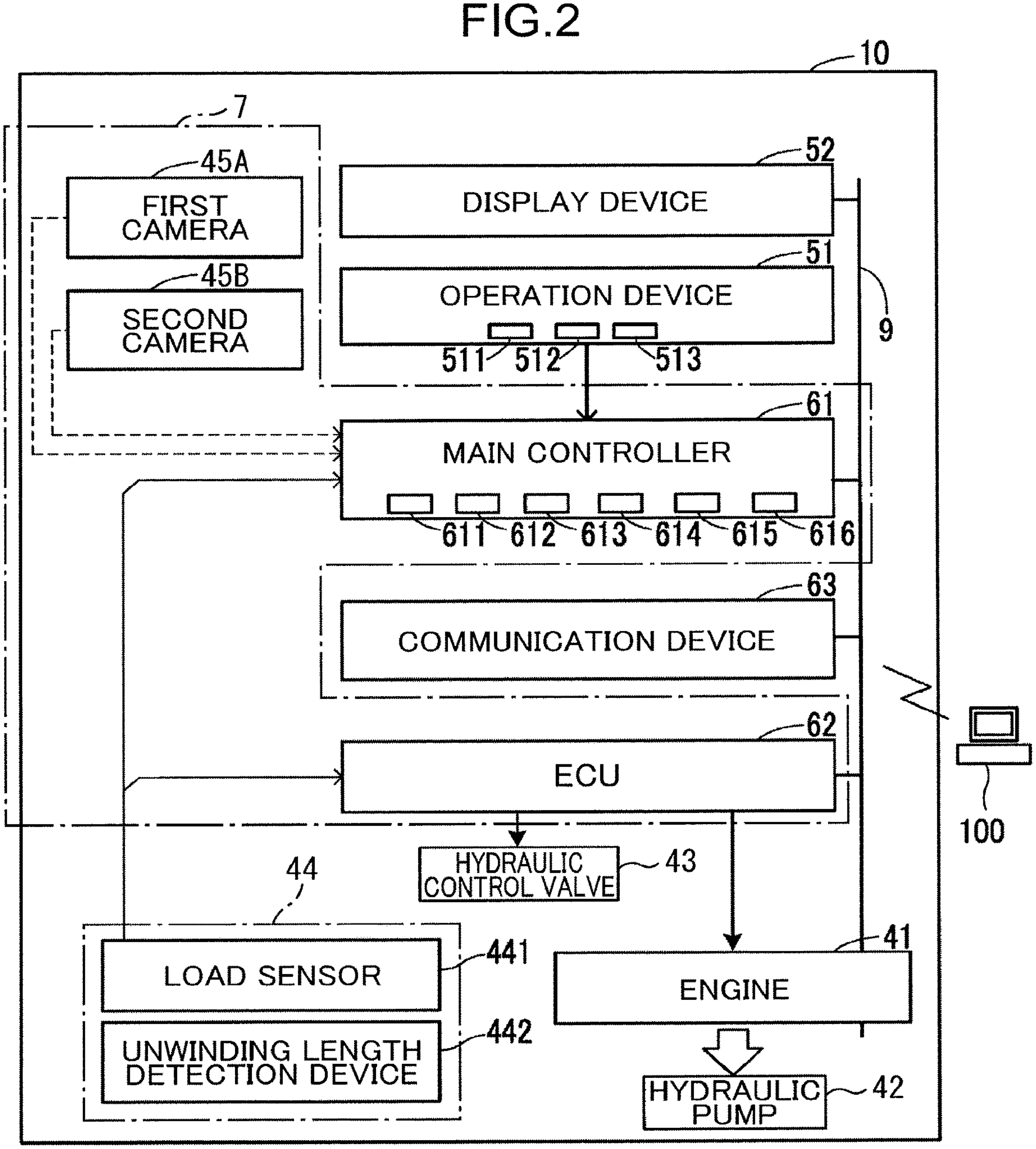
FIG. 2 is a block diagram representing control related equipment in the crane.

The crane 10 includes a plurality of drive system devices, a plurality of control system devices, and a communication device 63, which are shown in FIG. 2. The plurality of drive systems include an engine 41, a hydraulic pump 42, and a plurality of hydraulic control valves 43. The plurality of control system devices include a main controller 61 and an ECU (engine control unit) 62.

The crane 10 further includes an operation device 51, a display device 52, and a detection device 44. Each of the operation device 51 and the display device 52 is provided in the cab 13 for human interface. The detection device 44 includes a plurality of sensors to detect the state of the crane 10.

The operation device 51 allows an operation to be applied to the operation device 51 by an operator. The display device 52 displays information that is input to the display device 52, for the operator. The operation device 51 includes an operation lever 511, an operation button 512, and an input device 513.

The input device 513 allows information to be input to the input device 513 by an operator. For example, the input device 513 may be either a touch panel configured integrally with the display device 52 or a device that allows information to be input through the voice of an operator.

The detection device 44 includes a load sensor 441 and an unwinding length detection device 442. The load sensor 441 detects the weight of the suspended load. The unwinding length detection device 442 detects respective unwinding lengths of the first and second ropes 31A and 31B. The unwinding length is the length of the delivered part of each of the first and second ropes 31A, 31B, the delivered part being the part that is unwound from the drum 161 of each of the first and second winches 16A, 16B.

For example, the unwinding length detection device 442 includes a revolution number integration unit and a conversion unit.

The revolution number integration unit calculates the number of revolutions acquired by integrating a revolution number of the motor 162*a* of each of the first and second winches 16A, 16B with respect to both of a first rotational direction and a second rotational direction opposite to the first rotational direction, and calculates the value acquired by subtracting the integrated value of the revolution number with respect to the second rotational direction from the integrated value of the revolution number with respect to the first rotational direction as the integrated revolution number of the motor 162*a*. In the present embodiment, the first rotational direction is a rotational direction of the motor 162*a* corresponding to an unwinding direction, that is, a direction in which the drum 161 unwinds the rope, namely, the first rope 31A or the second rope 31B. The second rotational direction is a rotational direction of the motor 162*a* corresponding to a winding direction, that is, a direction in which the drum 161 winds the rope.

The conversion unit stores predetermined conversion information and, on the basis of the conversion information, converts the integrated revolution number of each of the first and second winches 16A, 16B calculated by the revolution number integration unit to the unwinding length of each of the first and second ropes 31A, 31B. The conversion information is stored in the conversion unit in the form of, for example, a transform equation or a look-up table. It is reflected in the conversion information that the winding length or the unwinding length per revolution of the drum 161 is increased with an increase in the wound layers of each of the first and second ropes 31A, 31B in the drum 161 of each of the first and second winches 16A, 16B.

The unwinding length detection device 442 may include a rotation sensor that counts the number of revolutions of the boom point idler sheave 22 or the number of revolutions of the gantry sheave 23, respectively. In this case, the unwinding length detection device 442 includes a conversion unit that converts the integrated value of the number of revolutions detected by the rotation sensor into the detected unwinding length.

The detection device 44 generates respective detection signals corresponding to the detection results, and inputs the detection signals to the main controller 61 and the ECU 62.

The main controller 61, the ECU 62, and the display device 52 are capable of communicating with each other through an in-vehicle LAN (Local Area Network) such as a CAN (Controller Area Network). In the present embodiment, the communication medium of the in-vehicle LAN is a bus 9 such as a CAN-BUS.

The engine 41 is, for example, a diesel engine that drives the hydraulic pump 42. The plurality of hydraulic control valves 43 are interposed between the hydraulic pump 42 and a plurality of non-illustrated actuators. Each of the hydraulic control valves 43 makes opening and closing action in accordance with a control signal that is input from the main controller 61, thereby enabling the main controller 61 to control the direction and flow rate of hydraulic fluid to be supplied from the hydraulic pump 42 to an actuator corresponding to the hydraulic control valve 43 among the plurality of actuators. The plurality of actuators actuate a plurality of driving objects including the first and second winches 16A, 16B, the travelling device 14, and the upper body 12, respectively. The plurality of actuators include the respective motors 162*a* of the first and second winches 16A, 16B.

Figure 6:
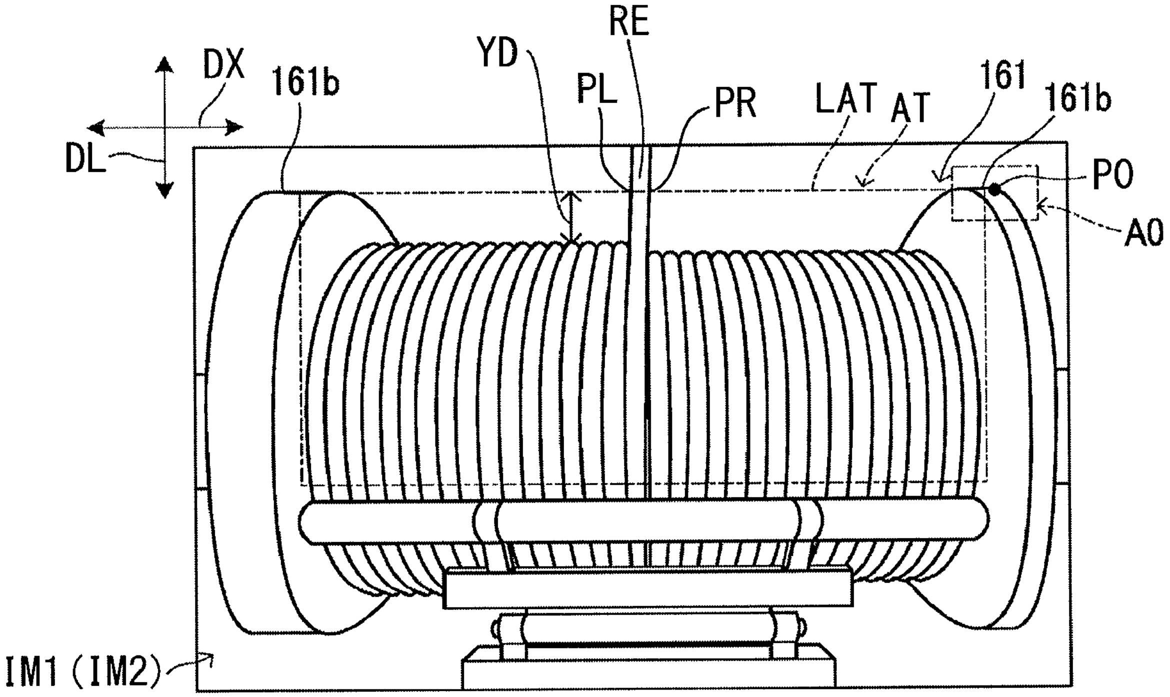
FIG. 6 shows an example of a captured image provided by a camera mounted on the crane.

The crane 10 further includes a first camera 45A, a second camera 45B, and a communication device, which are shown in FIG. 2. The first camera 45A is oriented toward the drum 161 in a first imaging direction, which is a direction intersecting the axial direction DX of the drum 161 in the first winch 16A, for example, a direction orthogonal to the axial direction DX. The first camera 45A generates a first captured image IM1 as shown in FIG. 6, which contains the drum 161 and the first rope 31A wound around the drum 161. Similarly, the second camera 45B is oriented toward the drum 161 along a second imaging direction, which is a direction intersecting the axial direction DX of the drum 161 in the second winch 16B, for example, a direction orthogonal to the axial direction DX. The second camera 45B generates a second captured image IM2 as shown in FIG. 6, which contains the drum 161 and the second rope 31B wound around the drum 161. The image shown in FIG. 6 corresponds to either of the first and second captured images IM1, IM2.

The main controller 61 generates control signals based on the plurality of detection signals generated by the detection device 44 and inputs the control signals to control objects. The control objects include the hydraulic control valve 43. For example, the detection device 44 includes a sensor for detecting the magnitude of the operation applied to the operation lever 511 of the operation device 51, namely, the operation amount of the operation lever 511, the sensor generating a detection signal on the operation amount and inputting the detection signal to the main controller 61. The main controller 61 generates a control signal corresponding to the operation amount and inputs the control signal to the hydraulic control valve 43, thereby controlling the action of the motor 162*a* of each of the first and second winches 16A and 16B. Besides, the main controller 61 makes the display device 52 perform necessary display.

To the main controller 61 are input a signal of the first captured image IM1 generated by the first camera 45A and a signal of the second captured image IM2 generated by the second camera 45*b*. The main controller 61 can make the display device 52 display at least one of the first captured image IM1 and the second captured image IM2 by input of a display command signal to the display device 52.

The main controller 61 also has a function of executing image processing, which is a processing on the first and second captured images IM1, IM2 generated by the first and second cameras 45A, 45B, detailed later. The image processing can be performed, for example, also by execution of a predetermined program by a processor provided separately from the MPU 601 of the main controller 61.

The ECU 62 controls the engine 41 in accordance with the plurality of detection signals that are input from the detection device 44 or the control commands that are input from the main controller 61. It is also possible that the ECU 62, instead of the main controller 61, controls equipment other than the engine 41, such as the hydraulic control valve 43, in accordance with the control command that is input from the main controller 61. The main controller 61 and the ECU 62 are, thus, an example of a control device.

The display device 52 displays the state of the crane 10 according to the display command signal that is input from the main controller 61. For example, the display device 52 includes at least one of a display lamp, a display instrument, and a panel display. The main controller 61 controls operation of equipment including the display device 52.

In the example shown in FIG. 1, the first camera 45A is supported by a support base 12*a* fixed to the upper body 12, and the second camera 45B is supported by the gantry 15.

The communication device 63 makes wireless communication with an external device such as a terminal device 100 shown in FIG. 2. The main controller 61 and the ECU 62 make communication with the external device through the communication device 63. For example, the communication device 63 makes communication with the external device through a wireless communication line such as a mobile communication network or Wi-Fi (registered trademark).

Figure 3:
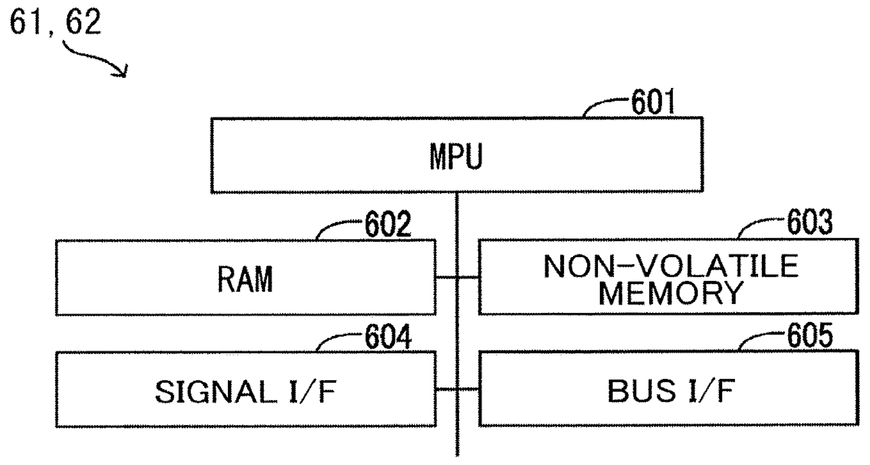
FIG. 3 is a block diagram showing respective configurations of a main controller, an ECU, and an image processing device in the crane.

As shown in FIG. 3, each of the main controller 61 and the ECU 62 includes the MPU (Micro Processing Unit) 601, a RAM (Random Access Memory) 602, a non-volatile memory 603, a signal interface 604 and a bus interface 605. Each of the RAM 602 and the non-volatile memory 603 is a computer-readable storage device.

The MPU 601 is an example of a processor that executes a program already stored in the non-volatile memory 603 to thereby execute data processing and control.

The RAM 602 is a volatile memory that temporarily stores the program to be executed by the MPU 601 and the data to be derived or referenced by the MPU 601.

The non-volatile memory 603 stores the program to be executed by the MPU 601 and the data to be referenced by the MPU 601. The non-volatile memory 603 is, for example, an EEPROM (Electrically Erasable Programmable Read Only Memory) or a flash memory.

The signal interface 604 converts the plurality of detection signals generated by the detection device 44 into digital data and transmits them to the MPU 601. Furthermore, the signal interface 604 converts the control command that is output by the MPU 601 into a control signal such as a current signal or a voltage signal and inputs it to the controlled object.

The bus interface 605 relays data communication through the bus 9 between the MPU 601 of the own device and the MPU 601 of the other device.

The first and second cameras 45A, 45B and the display device 52 enable an operator to detect the occurrence of disordered winding in each of the first and second winches 16A, 16B in the cab 13. The disordered winding, which is a state where the winding of each of the first and second ropes 31A, 31B by the drum 161 of each of the first and second winches 16A, 16B is disordered, may involve a trouble such as a temporary sudden drop of the suspended load. The generation of the first and second captured images IM1, IM2 containing the drum 161 in the first and second winches 16A, 16B by the first and second cameras 45A, 45B and the display of at least one of the first and second captured images IM1, IM2 by the display device 52 enable the operator to monitor the winding condition by the drum 161 through the first and second captured images IM1, IM2 displayed by the display device 52 while performing operations in the cab 13. When detecting disordered winding of the first or second ropes 31A and 31B, the operator performs an operation for rewinding the rope.

The operator, however, has to monitor conditions of the suspended load or the movement of the boom 21 or the like upon performing the operation, and therefore has to perform in parallel both the monitoring of the conditions and the monitoring of the first and second winches 16A, 16B through the display device 52. This may disable the operator from early detecting the disordered winding or cause the operator to miss the disordered winding. Furthermore, the winding condition of the rope 31 is likely to be shifted from a slight disorder condition to a severe disorder condition with an increase in the operating time and the number of operation times of operation of the first and second winches 16A and 16B. The severe disorder condition renders rewinding of the rope 31 required.

The crane 10 includes a winch monitoring apparatus 7 for solving such a problem. The winch monitoring apparatus 7 enables the disorder condition of the winding of each of the first and second ropes 31A, 31B to be detected in a slight stage enough to allow the operation of the first and second winches 16A, 16B to be continued. This facilitates the planning of working project by the crane 10. The winch monitoring apparatus 7 further predicts the operation remaining life of each of the first and second winches 16A, 16B until the arrival of the disorder condition at a severe stage, thereby further facilitating planning of the working project by the crane 10.

In the crane 10, the winch monitoring apparatus 7 includes the first and second cameras 45A and 45B, the MPU 601 of the main controller 61, and the ECU 62, monitoring the state of the first and second winches 16A and 16B. The winch monitoring apparatus 7 executes the winch monitoring processing shown in FIG. 5 to thereby enable the occurrence of disorder in the winding of each of the first and second ropes 31A, 31B by the drum 161 of each of the first and second winches 16A, 16B to be detected at a slight stage.

In the present embodiment, the execution of a predetermined program by the MPU 601 of the main controller 61 allows the main controller 61 to serve as a main processing unit 611, an image processing unit 612, a disorder judgment unit 613, a life prediction unit 614, a notification unit 615 and a winch control unit 616, which are shown in FIG. 2.

In the winch monitoring processing, the disorder judgment unit 613 judges whether the winding disorder of the first and second ropes 31A, 31B is present or absent and determines the disorder degree that is the degree of the winding when the winding disorder is present, based on the first and second captured images IM1, IM2 (FIG. 6) generated by the first and second cameras 45A, 45B, respectively.

In the winch monitoring processing, the life prediction unit 614 predicts the operation remaining life of the first and second winches 16A, 16B based on the disorder degree and the operation result of each of the first and second winches 16A, 16B.

There will be described below an example of the winch monitoring processing executed by the winch monitoring apparatus 7 with reference to the flowchart shown in FIG. 5.

The winch monitoring processing is included in embodiments of a winch monitoring method for monitoring the condition of the winch. The MPU 601 of the main controller 61 is an example of a processor that performs the judgment of the winding disorder and the output of the result of the judgment in the winch monitoring method.

The winch monitoring processing to be below described is performed for the first and second winches 16A and 16B by use of the first and second cameras 45A and 45B, respectively.

The main processing unit 611 of the main controller 61 makes the winch monitoring processing started upon the start of the engine 41 or the application of a predetermined start operation to the input device 513. The winch monitoring processing includes steps S101 to S115 shown in FIG. 5.

In step S101, the image processing unit 612 of the main controller 61 acquires the first and second captured images IM1, IM2 from the first and second cameras 45A, 45B, respectively. Specifically, respective signals of the first and second captured images IM1, IM2 are input from the first and second cameras 45A, 45B to the image processing unit 612, respectively.

In step S102, the image processing unit 612 sets a target area AT that is a part of the entire area of each of the first and second captured images IM1, IM2. The target area AT is set, for example, in the following procedure, so as to include an area between the pair of flange parts 161*b* of the drum 161.

The image processing unit 612 initially extracts a predetermined target image from a predetermined reference area A0 in each of the first and second captured images IM1, IM2, and sets the position of the target image as a reference position P0. The image processing unit 612 then determines the target area AT with the reference position P0 as a reference.

The reference area A0 is, in other words, an area having a predetermined relative positional relationship to the reference position P0 and having a predetermined shape and size. The shape and size of the reference area A0 are fixed by the characteristics of the first and second cameras 45A, 45B, the respective positional relationships between the first and second cameras 45A, 45B and the drums 161 of the first and second winches 16A, 16B, and respective orientations of the first and second cameras 45A, 45B.

In the example shown in FIG. 6, the reference area A0 is an area containing one end (the upper end in FIG. 6) of the flange part 161*b* which is one of the pair of flange parts 161*b* (right side in FIG. 6), and the target image is the image of the one end of the flange part 161*b*. With respect to the reference position P0, which is the position of the target image, as a reference, the area between the pair of flange parts 161*b*, 161*b* is set as the target area AT, as shown in FIG. 6.

For example, feature data representing the feature of the target image is prestored in the non-volatile memory 603 of the main controller 61. In this case, the image processing unit 612 extracts a partial image as the target image, from the reference area A0 of each of the first and second captured images IM1, IM2, the partial image having a feature that satisfies a predetermined approximation condition with respect to the feature represented by the feature data.

As the feature is employed, for example, at least one of the color of the image, HOG (Histograms of Oriented Gradients), SIFT (Scale-Invariant Feature Transform) and SURF (Speeded Up Robust Features).

The reference area A0, thus, is set based on the position of the target image extracted from each of the first and second captured images IM1, IM2. This allows the target area AT to be appropriately set with respect to not only the reference area A0 but also the reference position P0 extracted from the reference area A0, even when the vibration width of the drum 161 has a negligible magnitude in image processing.

In step S103, the image processing unit 612 determines respective unwinding positions of the first and second ropes 31A, 31B in the drum 161 of the first and second winches 16A and 16B on the basis of the first and second captured images IM1 and IM2.

In the present embodiment, the image processing unit 612 determines, in each of the first and second captured images IM1, IM2, respective positions at which respective extension regions RE of the first and second ropes 31A, 31B and a boundary line between the inside and the outside of the target area AT intersect, respectively, as the unwinding positions. The extension regions RE are respective regions of the first and second ropes 31A, 31B, each extending from the drum 161 in a direction intersecting the axial direction DX, for example, in a substantially orthogonal direction thereto.

For example, the image processing unit 612 detects respective images of intersection parts of the first and second ropes 31A, 31B, the intersection parts intersecting the upper boundary line LAT, which is the boundary line on the upper side of the target area AT, as respective images of the extension regions RE. The images of the extension regions RE are detected by well-known edge detection proceeding or color extraction proceeding.

Each of the unwinding positions is determined, for example, by a right unwinding position PR and a left unwinding position PL. The right unwinding position PR is the position of the intersection of the right edge of the image of the extension region RE and the upper boundary line LAT, and the left unwinding position PL is the position of the intersection of the left edge of the image of the extension region RE and the upper boundary line LAT. The image of the extension region RE, therefore, occupies the area between the right unwinding position PR and the left unwinding position PL.

In step S104, the image processing unit 612 determines the number of layers of winding of each of the first and second ropes 31A, 31B in the drum 161 of the first and second winches 16A, 16B. The number of layers is the number of each of wound layers of the first rope 31A and the second rope 31B formed on the outer peripheral surfaces of the drums 161 of the first and second winches 16A and 16B.

For example, the image processing unit 612 can determine the number of wound layers based on a determination distance YD shown in FIG. 6. The determination distance YD is the distance in a stacking direction DL from a reference line predetermined along the axial direction DX of each of the first and second winches 16A, 16B to the outermost layer of each of the first and second ropes 31A, 31B, wherein the stacking direction DL is a direction in which each of the first and second ropes 31A, 31B is stacked on the outer peripheral surface of the drum 161 of each of the first and second winches 16A, 16B, generally, the radial direction of the drum 161. The image processing unit 612 is pregiven the correspondence relationship between the determination distance YD and the number of layers.

The number of layers is also correlated with the unwinding length of each of the first and second ropes 31A, 31B. The number of layers, therefore, also can be determined based on the detection result of the unwinding length detection device 442, for example, by the main processing unit 611.

Next is executed the processing of step S105 described below, and then executed the processing of step S106.

In step S106, the disorder judgment unit 613 takes in the image of the target area AT in each of the first and second captured images IM1, IM2 as an input image, and performs a disorder degree determination about the winding condition of the first and second ropes 31A, 31B contained in the input image, by pattern recognition of the input image. The disorder degree determination includes judging whether the winding condition is a good condition or a disorder condition, and determining which of a plurality of disorder degree candidates that are already determined for the disorder degree the winding condition corresponds to when the winding condition is the disordered condition. The disorder degree determination is performed by the execution of a pattern recognition process.

The good condition is a condition where a disordered winding is absent as to each of the first and second ropes 31A, 31B. The plurality of disorder degree candidates are predetermined candidates for the disorder degree.

In the present embodiment, the disorder degree is represented by a disorder degree index NR which is selected from integers from 1 to NRmax (NRmax is an integer of 2 or more), and the integers from 1 to NRmax correspond to the disorder degree candidates in the NRmax stages, respectively.

The disorder degree index of 1 indicates that the winding of the first rope 31A or the second rope 31B is in the slightest disordered condition. The disorder degree index of the maximum value NRmax, namely, the maximum disorder degree index, indicates that the winding of the first rope 31A or the second rope 31B is in the severest disorder condition so as to require rewinding. The case where the disorder degree index is the maximum disorder degree index NRmax is an example of the case where the disorder degree is the limit degree.

In the present embodiment, the pattern recognition processing is a processing of classifying the input image into one of the good condition and the plurality of disorder condition candidates, by an already learnt learning model, with a plurality of sample images as to respective conditions corresponding to the good condition and the plurality of disorder degree candidates as teacher data.

For example, the learning model is a model in which a classification-type machine learning algorithm referred to as a random forest is adopted, or a model in which a machine learning algorithm called an SVM (Support Vector Machine) is applied, or a model in which a CNN (Convolutional Neural Network) algorithm is adopted or the like.

In step S105, the disorder judgment unit 613 selects the learning model to be used for determining the disorder degree, from among a plurality of already registered candidate models.

The learning model is a model of image recognition, which model has been already learnt with a plurality of sample images corresponding to the good condition and the plurality of disorder degree candidates as teacher data. The plurality of candidate models are a plurality of candidates of the learning model. The data of the plurality of candidate models is stored in the non-volatile memory 603 of the main controller 61.

Each of the sample images is an image of the target area AT contained in an image provided by the first camera 45A and the second camera 45B, being an image provided for the learning of the learning model in advance of the execution of the winch monitoring processing.

In the present embodiment, each of the candidate models is associated with a combination of candidates for the unwinding positions PR, PL and candidates of the number of wound layers. Specifically, the plurality of candidate models are the learning models that are learnt with the plurality of sample images different from each other in the combination of the unwinding positions PR, PL and the number of wound layers as teacher data, respectively.

The disorder judgment unit 613 selects the learning model to be used for the pattern recognition processing from among the plurality of candidate models. The candidate model to be selected is the candidate model that is most corresponding to the unwinding positions PR, PL and the number of wound layers with respect to each of the first captured image IM1 and the second captured image IM2.

In general, in order to increase the accuracy of the disorder degree determination, required is a huge amount of the teacher data for the learning of the learning model. Preparing a vast number of the sample images, however, requires a great deal of time and effort.

On the other hand, in the present embodiment, the sample image to be the teacher data is classified into a plurality of groups in advance depending on a combination of the unwinding positions PR, PL and the number of wound layers, and the learning of the model is performed for each group. This enables a plurality of candidate models that provide high determination accuracy simply to be acquired by only the preparation of a relatively few of sample images.

In step S106, the disorder judgment unit 613 determines the disorder degree on the basis of the image of the target area AT in each of the first and second captured images IM1, IM2.

Specifically, the disorder judgment unit 613 applies the image of the target area AT in each of the first and second captured images IM1, IM2 to the learning model selected in step S105, as the input image, thereby classifying the input image into one of the good condition and the plurality of (in the number NRmax of the stages) disorder degree candidates.

If the disorder judgment unit 613 judges the winding condition to be the good condition, the main controller 61 repeats the processing after the step S101.

If the disorder judgment unit 613 judges the disorder degree index NR to be a value other than the maximum disorder degree index NRmax, that is, judges the disorder condition not to be the limit degree, the main controller 61 executes the processing of steps S107 to S111.

In step S107, the life prediction unit 614 of the main controller 61 acquires information about the operation result of each of the first and second winches 16A and 16B.

For example, in the case where the winch control unit 616 records the information on operation result into the non-volatile memory 603 of the main controller 61, the life prediction unit 614 acquires the information on operation result from the non-volatile memory 603.

Besides, in the case where the winch control unit 616 records the information on operation result into an external device such as the terminal device 100 or other server device through the communication device 63, the life prediction unit 614 acquires the information on operation result from the external device through the communication device 63.

For example, the operation result includes at least one of the results of a rotation drive time of the drum 161, the winding length of the first and second ropes 31A, 31B, and the winding number of the first and second ropes 31A, 31B, in each of the first and second winches 16A, 16B.

Figure 7:
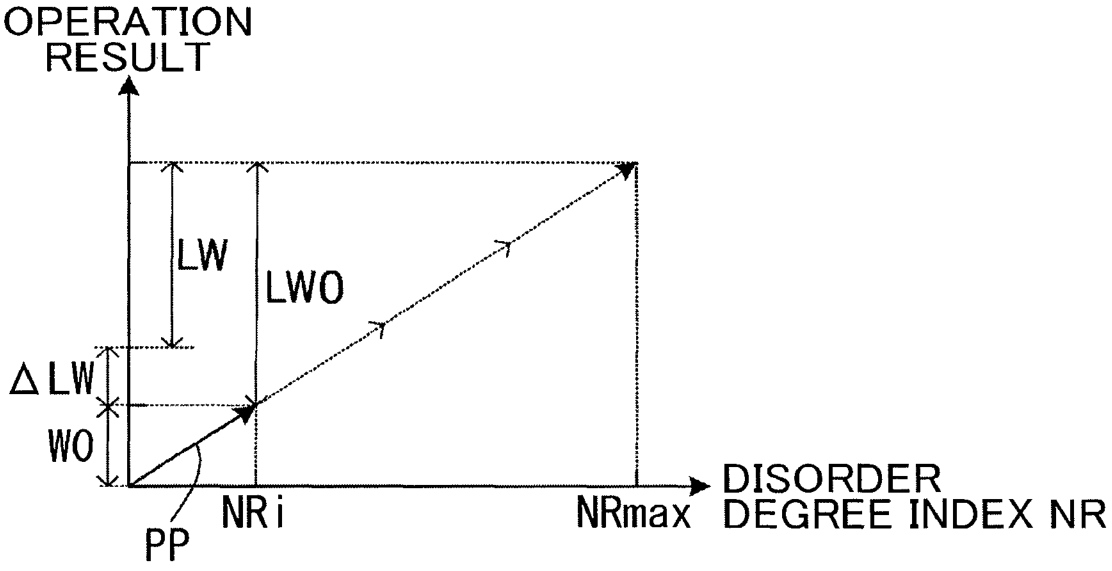
FIG. 7 is a view showing a first example of a relationship between a disorder degree of rope winding in the winch monitoring processing and an operation result and an operation remaining life of the winch.
Figure 8:
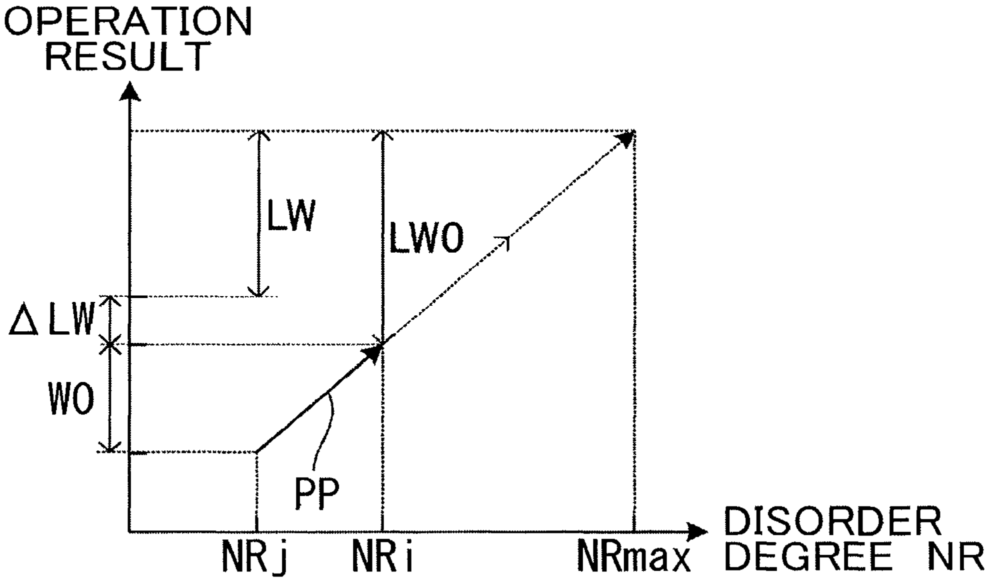
FIG. 8 is a view showing a second example of a relationship between a disorder degree of rope winding in the winch monitoring processing and an operation result and an operation remaining life of the winch.

In step S108, after the execution of step S107, the life prediction unit 614 determines the progress pace PP of the winding disorder as shown in FIGS. 7 and 8 based on the disorder degree index NR indicating the degree of progress of the disorder degree and the operation result in a period taken for the progress of the disorder degree.

FIGS. 7 and 8 show a first example and a second example of the relationship between the disorder degree index NR and the operation result, respectively. In the first example shown in FIG. 7, when the winding disorder is judged to have occurred for the first time after a predetermined reference time point, the life prediction unit 614 sets the operation result from the reference time point to the time point at which a disorder degree index NRi, which is the first determination value of the disorder degree, as a reference operation result W0. In this case, the life prediction unit 614 calculates the progress pace PP (=W0/NRi) as shown in FIG. 7 by dividing the value of the reference operation result W0 by the initial disorder degree index NRi.

In the second example shown in FIG. 8, when the disorder degree index corresponding to the disorder condition that has further progressed after the first judgment that the winding disorder has occurred, namely, the current disorder degree index NRi, is acquired, the life prediction unit 614 sets the operation result from the acquisition of the previous disorder degree index NRj to the acquisition of the current disorder degree index NRi as the reference operation result W0. In this case, the life prediction unit 614 calculates the progress pace PP (=W0/(NRi−NRj)) shown in FIG. 8 by dividing the value of the reference operation result W0 by the difference (NRi−NRj) between the current disorder degree index NRi and the previous disorder degree index NRj, that is, dividing by disorder progress degree.

The reference operation result W0 in the present embodiment includes at least one of the rotational driving time of the drum 161, a winding length of each of the first and second ropes 31A, 31B, and a winding number of each of the first and second ropes 31A, 31B, during the corresponding period.

The corresponding period is the period from the reference time point to the time point at which the initial disorder degree index NRi is acquired, or a period from the time point at which the previous disorder degree index NRj was acquired to the time point at which current disorder degree index NR is acquired.

After calculating the progress pace PP, the life prediction unit 614 executes the processing in step S109.

In step S109, the life prediction unit 614 predicts respective operational remaining lives LW of the first and second winches 16A, 16B as shown in FIGS. 7 and 8, respectively, based on the disorder degree index NR and the operation result.

In the present embodiment, the life prediction unit 614 predicts, as the operation remaining lives LW, respective operation amounts allowed for the winches 16A, 16B until the disorder degree index NR will have increased to the maximum disorder degree index NRmax, that is, until the disorder degree will have progressed to the maximum degree, at the progress pace PP.

In the present embodiment, the operation amount corresponding to the operation remaining life LW includes one or more of the rotational driving time of the drum 161, the winding length of each of the first and second ropes 31A, 31B, and the number of winding times of each of the first and second ropes 31A, 31B, each of which is allowed in each of the first and second winches 16A, 16B.

The life prediction unit 614 predicts, as the operation remaining life LW, the operation amount until the disorder degree will have progressed to the limit degree, that is, the operation amount allowed for each of the first and second winches 16A, 16B until the disorder degree index NR will have increased to the maximum disorder degree index NRmax at the progress pace PP.

Specifically, the life prediction unit 614 initially calculates a reference remaining life LW0 shown in FIG. 7 or FIG. 8. The reference remaining life LW0 is the operation amount allowed for each of the first and second winches 16A, 16B until the disorder degree index N will have increased to the maximum disorder degree index NRmax corresponding to the limit degree from the latest disorder degree index NRi at the progress pace PP.

In the first and second examples shown in FIGS. 7 and 8, the life prediction unit 614 multiplies the difference between the maximum disorder degree index NRmax corresponding to the limit degree and the latest disorder degree index NRi (=NRmax−NRi) by the progress pace PP to thereby calculate the reference remaining life LW0 (=PP×(NRmax−NRi)).

Next, as shown in FIGS. 7 and 8, the life prediction unit 614 sets the operation result (operation amount) from the point in time when the latest disorder degree index NRi was acquired to the present point in time as a differential operation result ΔLW corresponding to the difference between the reference remaining life LW0 and the actual operation remaining life LW.

Moreover, the life prediction unit 614 subtracts the differential operation result ΔLW from the reference remaining life LW0 to thereby calculate the operation remaining life LW (=LW0−ΔLW).

Next, in step S110, the notification unit 615 of the main controller 61 acquires manual data associated with the result of the judgment on the winding disorder. The manual data contains information for explaining an operation to be noted in accordance with the result of the determination of the disorder degree to an operator or the like. The manual data further includes information relating to a method for correcting the initial disordered winding in the drum 161, such as a method for rewinding the first and second ropes 31A, 31B. The notification unit 615 acquires the manual data, for example, from the non-volatile memory 603 of the main controller 61 or the external device.

Next, in step S111, the notification unit 615 outputs guidance information containing information about the determination result of the disorder degree, the operation remaining life LW, and the manual data, to one or both of the display device 52 and the terminal device 100, thereby rendering the determination result and the guidance information notified.

The notification unit 615, alternatively, may be configured to record the information containing the determination result of the disorder degree and the operation remaining life LW together with date and time information into the non-volatile memory 603 of the main controller 61.

After the output of the guidance information by the notification unit 615, the main controller 61 repeats the processing of the step S101 and the steps following it.

When the disorder judgment unit 613 judges the current disorder degree to be the limit degree in step S106, that is, determines the current disorder degree index NR to the maximum disorder degree index NRmax, the main controller 61 executes the processing of steps S112 to S115.

In step S112, the notification unit 615 executes processing for outputting an alarm indicating that the disorder degree has reached the limit degree. Specifically, the notification unit 615 inputs a command for making at least one device of the display device 52 and the terminal device 100 output the alarm to the at least one device. For example, the notification unit 615 outputs an alarm image and alarm information. The alarm image is at least one of the first and second captured images IM1, IM2 when the disorder degree is determined to be the limit degree. The alarm information includes the determination result of the disorder degree.

The alarm information may further contain information for prompting an operator to rewind the rope to be alerted out of the first rope 31A and the second rope 31B, and an image of the drum 161 in a good initial condition. The information enables an operator to perform a rewinding operation of the first rope 31A or the second rope 31B, which is the alarm target, with confirmation of the drum 161 to return to a good condition.

The notification unit 615, alternatively, may be configured to record the alarm information along with date and time information in the non-volatile memory 603 of the main controller 61.

Next, in step S113, the winch control unit 616 of the main controller 61 decelerates the rotation of the motor 162*a* of the winch with the disorder degree that is determined to the limit degree, out of the first and second winches 16A and 16B.

In step S113, the winch control unit 616 prioritizes the deceleration of the motor 162*a* even when an acceleration operation or a rotation maintaining operation is applied to the operation lever 511. The acceleration operation is an operation for accelerating the motor 162*a*, and the rotation maintaining operation is an operation for maintaining the rotational speed of the motor 162*a*. In contrast, when a deceleration operation for decelerating the motor 162*a* is detected as the operation applied to the operation lever 511, the winch control unit 616 decelerates the motor 162*a* in accordance with the detected deceleration operation. In step S113, thus, the winch control unit 616 restricts the control of the motor 162*a* corresponding to the acceleration operation or the rotation maintaining operation of all the operations applied to the operation lever 511.

In step S113, the winch control unit 616 may stop the rotation of the motor 162*a*. The winch control unit 616 may, for example, gradually decelerate the rotation of the motor 162*a* to eventually stop the motor 162*a*. The "deceleration of the motor 162*a*", thus, encompasses stopping the motor 162*a*.

In step S113, the winch control unit 616 may execute a control in a predetermined initial winding mode after the stop of the rotation of the motor 162*a*. In the initial winding mode, the winch control unit 616 judges the winding condition of the first layer of the rope (the first rope 31A or second rope 31B) wound by the drum 161 of the corresponding winch out of the first and second winches 16A and 16A, on the basis of the corresponding captured image out of the first and second captured images IM1 and IM2 provided by the first and second cameras 45A and 45B. In addition, the winch control unit 616 may also be configured to record the judgment result and the captured image of the drum 161 into the non-volatile memory 603 or the like.

Next, in step S114, the winch control unit 616 judges whether or not a predetermined confirmation operation has been applied to the input device 513. Until the judgment of the confirmation operation to be applied (NO in step S114), the winch control unit 616 continues the deceleration of the motor 162*a*. Unless the confirmation operation is applied to the input device 513, therefore, the winch control unit 616 continues the control of gradually decelerating the rotation of the motor 162*a* until the stop of the motor 162*a*.

At the point in time of judging the confirmation operation to be applied to the input device 513 (YES in step S114), the winch control unit 616 releases the restriction of the control to the motor 162*a* (step S115). From this point, the winch control unit 616 performs normal control of the motor 162*a* in accordance with the operation applied to the operation lever 511.

Figure 5:
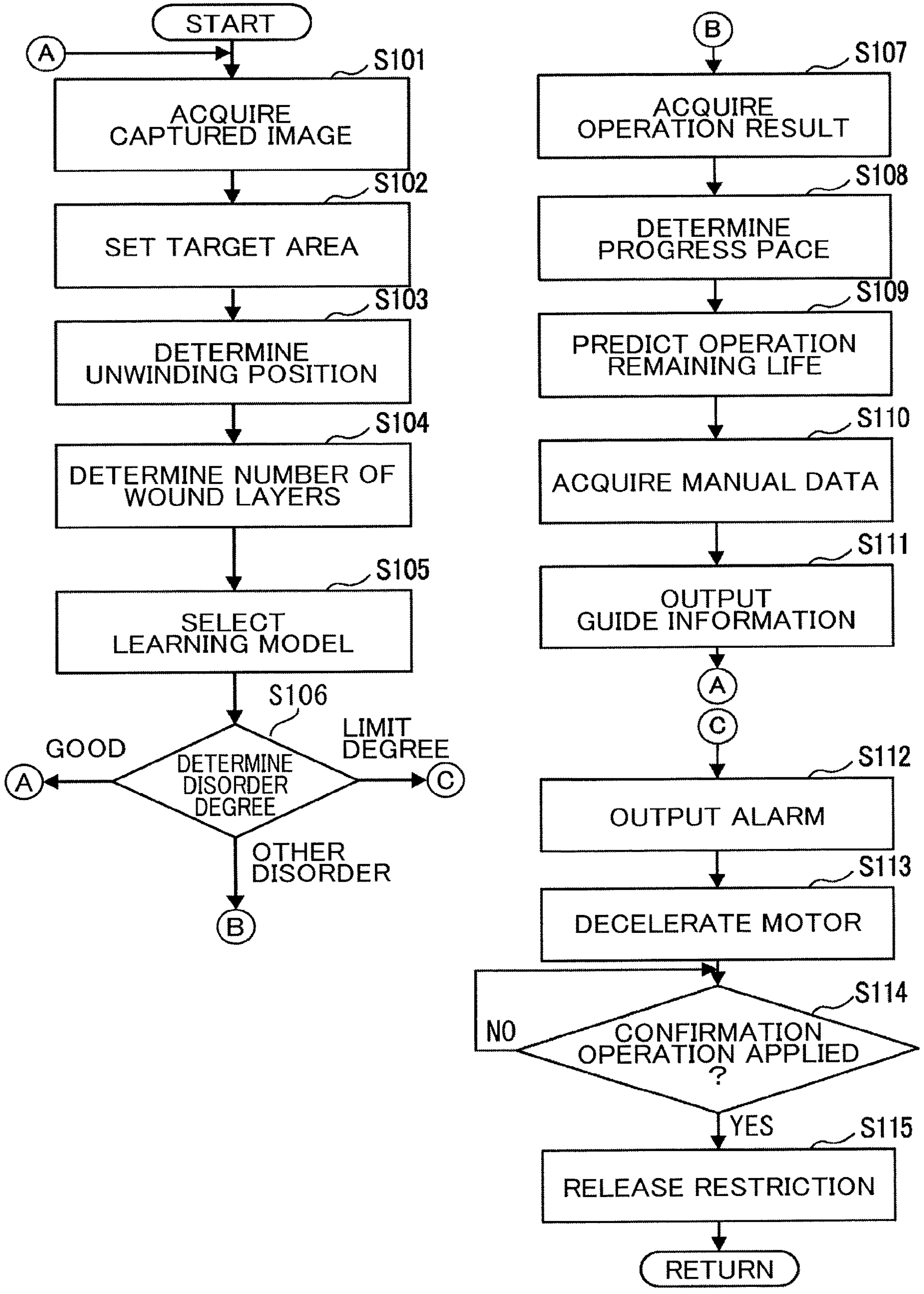
FIG. 5 is a flowchart showing an example of a processing for monitoring the winch.

The disorder judgment unit 613, thus, judges whether the winding disorder of each of the first and second ropes 31A, 31B is present or absent and determines the disorder degree that represents the degree of winding disorder, on the basis of the first and second captured images IM1, IM2 provided by the first and second cameras 45A, 45B (steps S102 to S106 in FIG. 5).

Furthermore, the notification unit 615 outputs the determination result of the disorder degree as a part of the guide information or the information on the alarm (refer to steps S111, S112 in FIG. 5).

The execution of the above-described winch monitoring processing by the winch monitoring apparatus 7 enables the winding disorder of the first and second ropes 31A, 31B in the respective drums 161 of the first and second winches 16A and 16B to be early judged in a slight stage.

Besides, the determination result of the disorder degree, when presented to an operator or a user of the terminal device 100, facilitates the planning of the working project of the crane 10.

In the present embodiment, the disorder judgment unit 613 determines the disorder degree by executing the pattern recognition processing in step S106. The pattern recognition processing according to the present embodiment is a processing of applying the image of the target area AT in the first and second captured images IM1, IM2 to the learning model and thereby classifying the image of the target area AT into one of the good condition and the plurality of disorder degree candidates.

The pattern recognition processing enables the disorder degree to be determined with high accuracy without any great deal of time or effort for adjusting the determination algorithm according to the difference in type or size of the first and second winches 16A, 16B.

In the steps S107 to S109, in accordance with the disorder degree and the operation result of each of the first and second winches 16A, 16B, the life prediction unit 614 predicts the operation remaining life LW of the winch.

Specifically, in step S108, as shown in FIGS. 7 and 8, the life prediction unit 614 determines the progress pace PP of the winding disorder each time, on the basis of the degree of the progress of the disorder degree and a reference operation result W0, which is the operation result in a period taken for the progress of the disorder degree.

Furthermore, in step S109, the life prediction unit 614 predicts, as the operation remaining life LW, the operation amount allowed for each of the first and second winches 16A, 16B until the disorder degree will have increased to the predetermined limit degree at the progress pace PP (refer to step S109 in FIG. 5 and FIGS. 7 and 8).

Besides, in step S111, the notification unit 615 outputs the prediction result of the operation remaining life LW as a part of the guidance information.

The prediction result of the operation remaining life LW, when thus presented to an operator or a user of the terminal device 100, facilitates the planning of the working project of the crane 10.

Figure 9:
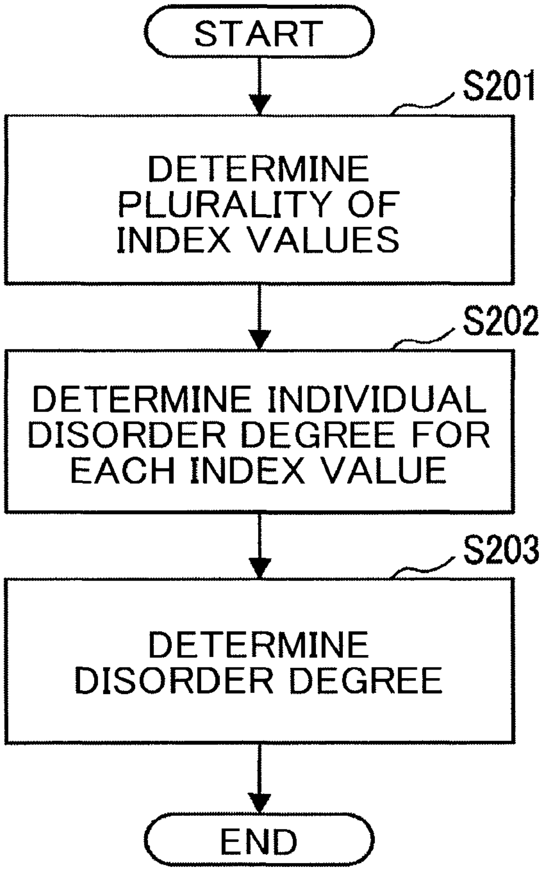
FIG. 9 is a flowchart showing an example of a disorder degree determination processing according to a first application of the winch monitoring processing.

FIG. 9 is a flowchart showing a disorder degree determination processing according to a first application. The disorder degree determination processing may be executed in place of the above processing of step S105 and step S106 in FIG. 5. The disorder degree determination processing is adoptable to also the winch monitoring processing.

Figure 10:
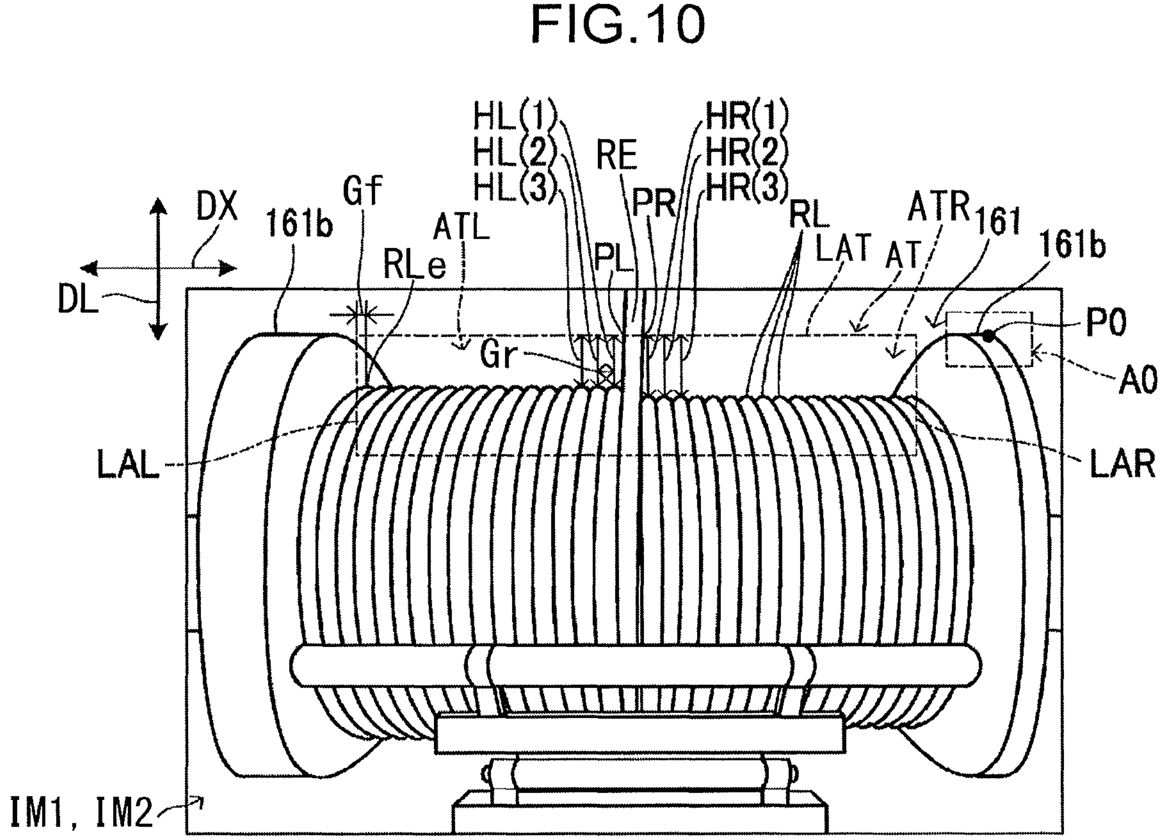
FIG. 10 is a diagram for explanation of an evaluation parameter that is derived from a captured image in a disorder degree determination processing according to the first application.

In step S201 of FIG. 9, the image processing unit 612 of the above-described main controller 61 determines a plurality of established index values from the images of the target area AT in the first and second captured images IM1, IM2 provided by the first and second cameras 45A, 45B, respectively. The plurality of index values are related to the winding condition of the first and second ropes 31A, 31B, including, for example, at least a part of a ridgeline interval Gr, a ridgeline height difference ΔHr, a layer step ΔHy, and a flange gap Gf which are shown in FIG. 10.

The ridgeline interval Gr is the interval between a plurality of ridgeline parts RL, which are aligned along each of the axial directions DX1, DX2 in each wound layer of the first and second ropes 31A, 31B.

The image processing unit 612 detects the plurality of ridgeline parts RL in each of the wound layers of the first and second ropes 31A, 31B in each of a right target area ATR and a left target area ATL that are contained in the target area AT set in the step S102. The right target area ATR is an area on the right side of the right unwinding position PR with respect to the axial direction DX, and the left target area ATL is an area on the left side of the left unwinding position PL in the axial direction DX.

Each of the ridgeline parts RL is a part formed in a convex shape in the outline of a wound part of the first and second ropes 31A, 31B around the drum 161.

As shown in FIG. 10, the plurality of ridgeline parts RL are formed to be aligned along the axial direction DX in each wound layer. The plurality of ridgeline parts R2 can be detected by well-known edge detection processing or color extraction processing.

The image processing unit 612 detects the plurality of ridgeline parts RL in each of the right target area ATR and the left target area ATL.

Furthermore, the image processing unit 612 detects a ridgeline height that is the height of the plurality of ridgeline parts RL. The ridgeline height is a distance in the stacking direction DL from a predetermined reference line to the plurality of ridgeline parts RL, the reference line being a straight line along the axial direction DX.

The ridgeline height includes a right ridgeline height HR and a left ridgeline height HL. The right ridgeline height HR is the height of the plurality of ridgeline parts RL detected in the right target area AR, and the left ridgeline height HL is the height of the plurality of ridgeline parts RL detected in the left target area AL.

In the example shown in FIG. 10, the reference line is the upper boundary line LAT of the target area AT. Accordingly, the smaller the values of the right and left ridgeline heights HR, HL, the greater the height of the plurality of ridgeline parts R2.

In FIG. 10 are typically shown three right ridgeline heights HRR (1), HRR (2) and HRR (3), and three left ridgeline heights HRL (1), HRL (2), and HRL (3). The reference numeral HR (m) is given to the height of the m-th ridgeline part RL counted from the right unwinding position PR with respect to the axial direction DX1, and the reference mark HL (m) is given to the height of the m-th ridgeline part RL counted from the left unwinding position PL with respect to the axial direction DX.

Moreover, the image processing unit 612 determines an outermost layer height Hmax that is the greater height of the right ridgeline height HR and the left ridgeline height HL. For example, as the outermost layer height Hmax, the image processing unit 612 determines the higher one selectively from the representative height of the plurality of right ridgeline heights HR (1), HR (2) . . . and the representative height of the plurality of left ridgeline heights HL (1), HL (2) . . . . The representative height is, for example, the average height or the maximum height.

The image processing unit 612 also can determine the area containing the outermost layer height Hmax selectively from the right target area ATR and the left target area ATL on the basis of the rotational direction of the motor 162*a* and the movement direction of the unwinding positions PR, PL.

When the motor 162*a* is rotated in the direction of winding the rope (the first rope 31A or the second rope 31B), the area containing the outermost layer height Hmax, out of the right target area ATR and the left target area ATL, is the upstream area in the movement direction of the unwinding positions PR, PL.

In contrast, when the motor 162*a* is rotated in the direction of unwinding the rope, the area corresponding to the outermost layer height Hmax, out of the right target area ATR and the left target area ATL, is the downstream area in the movement direction of the unwinding positions PR, PL.

Furthermore, as shown in FIG. 10, the image processing unit 612 derives the ridgeline interval Gr for each wound layer. For example, the image processing unit 612 determines, as the ridgeline interval GL, an interval in the axial direction DX between the ridgeline part RL that is the closest to the unwinding positions PR, PL and the ridgeline part RL that is the second closest to the unwinding positions PR, PL in the area corresponding to the outermost layer height Hmax out of the right target area ATR and the left target area ATL. The ridgeline interval Gr illustrated in FIG. 10 is the interval between the two ridgeline parts RL, RL in the right target area ATR.

The ridgeline height difference ΔHr is the difference in height between the plurality of ridgeline parts RL in each wound layer.

The image processing unit 612 determines the difference between the plurality of right ridgeline height HR or the difference between the plurality of left ridgeline heights HL as the ridgeline height difference ΔHr. For example, the image processing unit 612 determines, as the ridgeline height difference ΔHr, the difference between the height of the ridgeline part RL that is the closest to the unwinding position PR and PL and the height of the ridgeline part RL that is the second closest thereto in the area containing the outermost layer height Hmax of the right target area ATR and the left target area ATL. In the example shown in FIG. 10, the absolute value of the difference between the two left ridgeline heights HL (1), HL (2) determined in the left target area ATL is determined as the ridgeline height difference ΔHr.

The layer step ΔHy is the difference between the height of the ridgeline part RL in the region after the increase in the wound layers and the height of the ridgeline part RL in the region before the increase in the wound layers. For example, the image processing unit 612 derives the absolute value of the difference between the representative height of the plurality of right ridgeline height HR and the representative height of the plurality of left ridgeline height HL as the layer step Δhy.

The flange gap Gf is the interval between the closer flange part 161*b* of the pair of flange parts 161*b* and an end ridgeline part RLe, the closer flange part 161*b* being one of the pair of flange parts 161*b* formed at opposite ends of the drum 161 in the axial direction DX and closer to the end ridgeline part RLe. The edge ridgeline part RLe is the ridgeline part RL that is included in the plurality of ridgeline parts RL and initially formed in the outermost layer when the wound layer of the plurality of ridgeline parts RL is increased.

For example, when the unwinding positions PR, PL moves in a direction of going away from the right boundary line LAR or the left boundary line LAL of the target area AT inward of the target area AT along with the rotation of the motor 162*a* in the direction of winding the first rope 31A (or the second rope 31B), the image processing unit 612 determines, as the position of the edge ridgeline part RLe, the position of the ridgeline part RL that is initially detected between the right boundary line LAR or the left boundary line LAL and the unwinding positions PR, PL.

Next, in step S202 in FIG. 9, the disorder judgment unit 613 determines a plurality of individual disorder degrees corresponding to the plurality of index values, respectively, based on the plurality of index values. For example, the disorder judgment unit 613 determines respective individual disorder degrees for the index values by comparison between the plurality of index values and a plurality of predetermined thresholds for the plurality of index values, respectively.

Next, in step S203, the disorder judgment unit 613 determines a total disorder degree on the basis of the plurality of individual disorder degrees. For example, the disorder judgment unit 613 derives the severest one of the plurality of individual disorder degrees (i.e., the one with the highest disorder degree index) or the average of the plurality of individual disorder degrees (i.e., the average value of the disorder degree indexes) as the total disorder degree.

In the processing of step S105 and step S106 in FIG. 5 may be executed a disorder degree determination processing according to the below-described second application. The disorder degree determination processing is adoptable to also the winch monitoring processing.

In the second application, in step S106 in FIG. 5, the disorder judgment unit 613 executes pattern recognition processing with regarding the image of the target area AT in each of the first and second captured images IM1, IM2 as an input image. The pattern recognition processing is a processing of determining which condition the input image shows among the good condition and respective conditions corresponding to the plurality of disorder degree candidates, by pattern recognition of the input image.

In the present application, the data of a plurality of candidate reference images is already stored in the non-volatile memory 603 of the main controller 61. The plurality of candidate reference images are associated with combinations of candidates for the unwinding positions PR, PL and candidates for the number of layers, and further associated with one of the good condition or the plurality of disorder degree candidates.

In step S105 in FIG. 5, the disorder judgment unit 613 selects from among the plurality of candidate reference images, as a plurality of reference images, the images that correspond to the unwinding positions PR, PL and the number of layers with respect to each of the first and second captured images IM1, IM2 and correspond to the good condition and the plurality of disorder degree candidates.

The pattern recognition processing in the present application is a processing of determining the degree of approximation between the image of the target area AT in each of the first and second captured images IM1, IM2 and each of the selected reference images to thereby determine the good condition or the disorder degree.

For example, the disorder judgment unit 613 in the present application extracts respective features in the image of the target area AT and the plurality of reference images, and determines the approximation degree of each of the thus extracted features.

The features include, for example, SIFT (Scale-Invariant Feature Transform) features or SURF (Speeded-Up Robust Features) features.

The disorder judgment unit 613 determines the reference image having the highest approximation degree among the plurality of reference images to thereby determines the good condition or the disorder degree.

In the first application, the good condition or the disorder degree is determined mainly based on the condition of the ridgeline part RL of each of the first and second ropes 31A, 31B wound around the drum 161.

On the other hand, in the embodiment or the second application, the condition of the part other than the ridgeline part RL in the first and second ropes 31A, 31B wound around the drum 161 can be reflected in the determination of the good condition or the disorder degree.

For example, each of the sample images in the embodiment or each of the reference images in the second application may include a plurality of images that show a condition in which respective gaps between stacked portions of each of the first and second ropes 31A, 31B on the drum 161 have different sizes. In this case, the disorder degree is determined based on the size of the gap between the stacked portions.

While the disorder judgment unit 613, in each of the embodiment, the first application, and the second application, determines the good condition or the disorder degree on the basis of the image of the target area AT in each of the first and second captured images IM1, IM2, the disorder judgment unit 613 may determine the good condition or the disorder degree on the basis of the whole of each of the first and second captured images IM1, IM2 or an image of a predetermined specific area in each of the first and second captured images IM1, IM2.

The target area AT is not limited to one determined with the reference position P0 as a reference, the reference position P0 extracted from the reference area A0, as in the above-described embodiment. For example, it is also possible that not the ridgeline part RL or the unwinding position but a specific region around the center axis of the winch (e.g., an area slightly below the target area AT shown in FIG. 10) is captured by the camera and the winding condition of the rope (e.g., rope removal or rope recess) in the specific area is detected. This aspect requires no determination of either of the reference area A0 and the reference position P0 and, for example, it is also possible that an AI-learned learning model determines the image at a predetermined position in the specific area. The aspect requires no selection of the learning model corresponding to the unwinding position, and further allows, in some cases, the selection of the learning model according to the number of layers to be also omitted. Specifically, in the flowchart of FIG. 5 are unrequired the steps S103 to S105.

Although, in the embodiment and the first and second applications, it is performed to monitor each of the first and second winches 16A, 16B in the crane 10 equipped therewith, neither the number of winches mounted on the crane according to the present disclosure nor the number of monitoring-target winches to be monitored by the winch monitoring apparatus is limited. For example, the present disclosure encompasses also a crane equipped with three or more winches. Besides, the winch monitoring apparatus according to the present disclosure may also monitor only a part of the plurality of winches (e.g., only a single winch) mounted on the crane.

The processor that judges the winding disorder and outputs the result of the judgment is not limited to the above main controller 60. The processor may be, for example, either a controller for communication or dedicated to AI, or may be incorporated within a camera. Alternatively, it may be a remote server located at a position far from a crane body and configured to receive a signal related to an image captured by and transmitted from the camera to perform the judgment and the output.

Thus, provided are a winch monitoring method, a winch monitoring apparatus, and a crane, each of which enables disordered rope winding in a drum of a winch to be early detected.

Provided is a method for monitoring a condition of a rope wound around a drum of a winch. The method includes: orienting a camera to the drum to acquire a captured image of the drum and the rope by the camera; performing judgment on whether a winding disorder of the rope is present or absent and determination of a disorder degree that is a degree of the winding disorder when the winding disorder is present, on the basis of the captured image; and outputting a result of the judgment and the determination.

The method, including judging a winding condition of the rope in the drum based on the captured image acquired by the camera and outputting the result of the judgment, enables the winding disorder to be early detected.

Preferably, the method further includes: acquiring information on an operation result of the winch; performing prediction of an operation remaining life of the winch based on the disorder degree and the operation result; and outputting a result of the prediction. This allows not only the winding disorder to be detected but also the operation remaining life of the winch to be recognized by the operator.

The prediction of the operation remaining life can be performed, for example, by determining a progress pace of the winding disorder according to a degree of progress of the disorder degree and the operation result in a period taken for the progress of the disorder degree each time the disorder degree progresses, and predicting, as the operation remaining life, an operation amount allowed for the winch until the disorder degree will have progressed to a predetermined limit degree at the progress pace.

The operation result, for example, includes at least one of a rotational driving time of the drum in the winch, a winding length of the rope, and a winding number of the rope, and the operation remaining life includes at least one of the rotational driving time, the winding length, and the winding number, each of which is allowed for the winch.

The determination of the disorder degree can be performed, for example, by executing a pattern recognition process. The pattern recognition processing is a processing of determining which an input image corresponds to, among a good condition and a predetermined plurality of disorder degree candidates, with regarding the captured image as the input image, by pattern recognition of the input image.

More specifically, it is preferable that determining the disorder degree includes: determining an unwinding position at which the rope is unwound from the drum; determining a number of layers of the rope to be wound around the drum; and selecting a plurality of reference images that correspond to the unwinding position and the number of layers with respect to the captured image and correspond to the plurality of disorder degree candidates from among a plurality of reference image candidates associated with combination of the candidate of the unwinding position and the candidate of the number of layers and associated with one of the good condition and the plurality of disorder degree candidates, wherein the pattern recognition processing is a processing for determining the good condition or the disorder degree by determining an approximation degree between the captured image and the selected plurality of reference images.

The pattern recognition process, alternatively, may be a processing of classifying the input image into one of the good condition and the plurality of disorder degree candidates by a learning model that is already learned with a plurality of sample images corresponding to the good condition and the plurality of disorder degree candidates, respectively, as teacher data.

In this mode, it is preferred that determining the disorder degree includes: determining an unwinding position at which the rope is unwound from the drum; determining a number of layers of the rope wound around the drum; and selecting, from among a plurality of learning model candidates associated with the combination of the candidate of the unwinding position and the candidate of the number of layers, the learning model candidate that corresponds to the unwinding position and the number of layers with respect to the captured image, as the learning model to be used for the pattern recognition processing.

The method may further include acquiring manual data associated with the determination result of the winding disorder and outputting guidance information based on the manual data.

Also provided is an apparatus for monitoring a condition of a rope wound around a drum of a winch. The apparatus includes: a camera oriented to the drum of the winch to generate a captured image of the drum and the rope; and a processor that performs judgment on whether a winding disorder of the rope is present or absent and determination of a disorder degree that is a degree of the winding disorder when the winding disorder is present, on the basis of the captured image, and outputs a result of the judgment and the determination.

Also provided is a crane including a boom, a winch, a camera, and a processor. The boom has a distal end from which a suspended load is suspended. The winch includes a drum for winding a rope that supports the suspended load or the boom and a motor for rotating the drum. The camera is oriented to the drum to generate a captured image of the drum and the rope. The processor performs judgment on whether a winding disorder of the rope is present or absent and determination of a disorder degree that is a degree of the winding disorder, on the basis of the captured image, and outputs a result of the judgment and the determination.

Preferably, the processor further performs: acquisition of information on an operation result of the winch; prediction of an operation remaining life of the winch based on the disorder degree and the operation result; and outputting a result of the prediction.

For the prediction of the operation remaining life, preferably, the processor performs determining a progress pace of the winding disorder according to a degree of progress of the disorder degree and the operation result in a period taken for the progress of the disorder degree and predicting, as the operation remaining life, an operation amount allowed for the winch until the disorder degree will have progressed to a predetermined limit degree at the progress pace.

For example, the operation result includes at least one of a rotational driving time of the drum in the winch, a winding length of the rope, and a winding number of the rope, and the operation remaining life includes at least one of the rotational driving time, the winding length, and the winding number, each of which is allowed for the winch.

The processor preferably executes a pattern recognition processing to determine the disorder degree. The pattern recognition processing is a processing of determining which an input image corresponds to, among a good condition and a predetermined plurality of disorder degree candidates, with regarding the captured image as the input image, by pattern recognition of the input image.

More specifically, for determining the disorder degree, the processor preferably performs: determining an unwinding position at which the rope is unwound from the drum; determining a number of layers of the rope to be wound around the drum; and selecting a plurality of reference images that correspond to the unwinding position and the number of layers with respect to the captured image and correspond to the plurality of disorder degree candidates from among a plurality of reference image candidates associated with the combination of the candidate of the unwinding position and the candidate of the number of layers and associated with one of the good condition and the plurality of disorder degree candidates, the pattern recognition processing being a processing of determining the good condition or the disorder degree by determining an approximation degree between the captured image and the selected plurality of reference images.

The pattern recognition process, alternatively, may be a processing of classifying the input image into one of the good condition and the plurality of disorder degree candidates by a learning model that is already learned with a plurality of sample images corresponding to the good condition and the plurality of disorder degree candidates, respectively, as teacher data.

In this mode, for determining the disorder degree, the processes performs: determining an unwinding position at which the rope is unwound from the drum; determining a number of layers of the rope wound around the drum; and selecting, from among a plurality of learning model candidates associated with combination of the candidate of the unwinding position and the candidate of the number of layers, the learning model candidate that corresponds to the unwinding position and the number of layers with respect to the captured image, as the learning model to be used for the pattern recognition processing.

The processor may further perform acquiring manual data associated with the determination result of the winding disorder and outputting guidance information based on the manual data.

The invention claimed is:

1. A winch monitoring method for monitoring a condition of a rope wound around a drum of a winch, the method comprising:

orienting a camera to the drum to acquire a captured image of the drum and the rope by the camera;

judging that a winding disorder of the rope is present;

determining a disorder degree that is a degree of the winding disorder on a basis of the captured image;

outputting results of the judging and the determining;

acquiring information on an operation result of the winch;

performing a prediction of an operation remaining life of the winch on a basis of the disorder degree and the operation result; and outputting a result of the prediction, wherein performing the prediction of the operation remaining life includes determining a progress pace of the winding disorder according to a degree of progress of the disorder degree and the operation result in a period taken for the progress of the disorder degree each time the disorder degree progresses, and predicting, as the operation remaining life, an operation amount allowed for the winch until the disorder degree will have progressed to a predetermined limit degree at the progress pace.

2. The winch monitoring method according to claim 1, wherein the operation result includes at least one of a rotational driving time of the drum in the winch, a winding length of the rope, and a winding number of the rope, and the operation remaining life includes at least one of the rotational driving time, the winding length, and the winding number, each of which is allowed for the winch.

3. The winch monitoring method according to claim 1, wherein performing the determination of the disorder degree includes: executing pattern recognition processing, which is a processing of determining to which an input image corresponds, among a good condition and a predetermined plurality of disorder degree candidates, with regarding the captured image as the input image, by the pattern recognition processing of the input image.

4. The winch monitoring method according to claim 3, wherein performing the determination of the disorder degree further includes:

determining an unwinding position at which the rope is unwound from the drum;

determining a number of layers of the rope to be wound around the drum; and selecting a plurality of reference images that correspond to the unwinding position and the number of layers with respect to the captured image and correspond to the predetermined plurality of disorder degree candidates from among a plurality of reference image candidates associated with a combination of a candidate of the unwinding position and a candidate of the number of layers and associated with one of the good condition and the predetermined plurality of disorder degree candidates, the pattern recognition processing being a processing of determining the good condition or the disorder degree by determining an approximation degree between the captured image and the selected plurality of reference images.

5. The winch monitoring method according to claim 3, wherein the pattern recognition processing is a processing of classifying the input image into one of the good condition and the predetermined plurality of disorder degree candidates by a learning model that is trained with a plurality of sample images corresponding to the good condition and the predetermined plurality of disorder degree candidates, respectively, as teacher data.

6. The winch monitoring method according to claim 5, wherein performing the determination of the disorder degree further includes:

determining an unwinding position at which the rope is unwound from the drum;

determining a number of layers of the rope wound around the drum; and selecting, from among a plurality of learning model candidates, a target learning model candidate that corresponds to the unwinding position and the number of layers with respect to the captured image, as the learning model to be used for the pattern recognition processing, the plurality of learning model candidates being the learning models that are different from each other in the combination of a candidate of the unwinding position and a candidate of the number of layers.

7. The winch monitoring method according to claim 1, further comprising acquiring manual data associated with the result of the determination of the winding disorder from a storage device, and outputting guidance information based on the manual data, the manual data stored in the storage device including information for explaining an operation to be noted in accordance with the result of the determination of the disorder degree to an operator and information relating to a method for rewinding the rope.

8. A winch monitoring apparatus for monitoring a condition of a rope wound around a drum of a winch, the apparatus comprising:

a camera oriented to the drum of the winch to generate a captured image of the drum and the rope; and a processor configured to perform a judgment on whether a winding disorder of the rope is present or absent and a determination of a disorder degree that is a degree of the winding disorder, on a basis of the captured image, and to output the results of the judgment and the determination, wherein the processor is further configured to:

acquire information on an operation result of the winch;

predict an operation remaining life of the winch based on the disorder degree and the operation result; and output a result of the prediction.

9. A crane comprising:

a boom having a distal end from which a suspended load is suspended;

a winch including a drum for winding a rope that supports the suspended load or the boom and a motor for rotating the drum;

a camera oriented to the drum to generate a captured image of the drum and the rope; and a processor configured to perform a judgment on whether a winding disorder of the rope is present or absent and a determination of a disorder degree that is a degree of the winding disorder, on a basis of the captured image, and to output the results of the judgment and the determination, wherein the processor is further configured to:

acquire information on an operation result of the winch;

predict an operation remaining life of the winch based on the disorder degree and the operation result; and output a result of the prediction.

10. The crane according to claim 9, wherein the processor is further configured to, for predicting the operation remaining life, determine a progress pace of the winding disorder according to a degree of progress of the disorder degree and the operation result in a period taken for the progress of the disorder degree and predicting, as the operation remaining life, an operation amount allowed for the winch until the disorder degree will have progressed to a predetermined limit degree at the progress pace.

11. The crane according to claim 9, wherein the operation result includes at least one of a rotational driving time of the drum in the winch, a winding length of the rope, and a winding number of the rope, and the operation remaining life includes at least one of the rotational driving time, the winding length, and the winding number, each of which is allowed for the winch.

12. The crane according to claim 9, wherein the processor is configured to execute pattern recognition processing of determining the disorder degree, the pattern recognition processing being a processing of determining to which an input image corresponds, among a good condition and a predetermined plurality of disorder degree candidates, with regarding the captured image as the input image, by the pattern recognition processing of the input image.

13. The crane according to claim 12, wherein the pattern recognition processing is a processing of classifying the input image into one of the good condition and the predetermined plurality of disorder degree candidates by a learning model that is trained with a plurality of sample images corresponding to the good condition and the predetermined plurality of disorder degree candidates, respectively, as teacher data.

14. The crane according to claim 9, further comprising a storage device that stores manual data, the manual data, the manual data including information for explaining an operation to be noted in accordance with the result of the determination of the disorder degree to an operator and information relating to a method for rewinding the rope, wherein the processor is further configured to acquire manual data associated with the result of the determination of the winding disorder from the storage device, and output guidance information based on the manual data.

* * * * *